United States Patent [19]

Hansen et al.

[11] Patent Number: 5,360,584
[45] Date of Patent: Nov. 1, 1994

[54] METHOD OF FORMING A WRAP-AROUND HEAT-RECOVERABLE ARTICLE

[75] Inventors: Erling Hansen, Los Altos; Steve Wicht, Newark, both of Calif.

[73] Assignee: Raychem Corporation, Menlo Park, Calif.

[21] Appl. No.: 142,544

[22] Filed: Oct. 22, 1993

Related U.S. Application Data

[63] Continuation of Ser. No. 794,823, Nov. 18, 1991, abandoned, which is a continuation of Ser. No. 640,565, Jan. 14, 1991, abandoned, which is a continuation of Ser. No. 436,958, Nov. 15, 1989, abandoned, which is a continuation of Ser. No. 262,163, Oct. 19, 1988, abandoned, which is a continuation of Ser. No. 877,620, Jun. 23, 1986, abandoned.

[51] Int. Cl.$^5$ .............................................. B29C 61/06
[52] U.S. Cl. ......................................... 264/22; 156/85; 156/86; 264/132; 264/156; 264/230; 264/177.1; 264/285; 264/339; 264/342 R; 264/177.19
[58] Field of Search ................ 264/22, 230, 132, 156, 264/209.1, 209.4, 285, 339, 342 R, DIG. 71, 177.1, 177.17, 177.19; 156/85, 86; 428/35.1

[56] References Cited

U.S. PATENT DOCUMENTS

| | | |
|---|---|---|
| 208,363 | 9/1878 | Brandeis . |
| 2,138,568 | 11/1938 | Brandenberger . |
| 2,613,620 | 10/1952 | Allen . |
| 2,629,953 | 3/1953 | Von Stackelberg et al. .......... 40/21 |
| 2,929,161 | 3/1960 | Kuyk ................................ 40/2 |
| 2,952,037 | 9/1960 | Ruck et al. . |
| 3,000,057 | 9/1961 | Swedlow et al. . |
| 3,086,242 | 4/1963 | Cook et al. . |
| 3,402,873 | 9/1968 | Lauterback, Jr. . |
| 3,416,991 | 12/1968 | Yoshimura . |
| 3,426,115 | 2/1969 | Taber ................................ 264/339 |
| 3,461,499 | 8/1969 | Nevin et al. . |
| 3,483,285 | 12/1969 | Foley ................................ 264/146 |
| 3,558,420 | 1/1974 | Opfell . |
| 3,620,896 | 11/1971 | Glasgow . |
| 3,847,721 | 11/1974 | Evans . |
| 3,848,035 | 11/1974 | Behr . |
| 3,894,731 | 7/1975 | Evans . |
| 3,899,807 | 8/1975 | Sovish et al. . |
| 3,988,399 | 10/1976 | Evans ................................ 264/22 |
| 4,032,010 | 6/1977 | Evans ................................ 206/345 |
| 4,093,683 | 6/1978 | Harley ................................ 264/339 |
| 4,150,184 | 4/1979 | Tesch ................................ 264/146 |
| 4,191,405 | 3/1980 | Johnstun ............................ 282/28 A |
| 4,349,404 | 9/1982 | Changani et al. ................. 156/308.4 |
| 4,366,201 | 12/1982 | Changani et al. .................... 264/230 |
| 4,425,390 | 1/1984 | Changani et al. .................... 264/22 |
| 4,465,717 | 8/1984 | Crofts et al. ......................... 428/40 |
| 4,472,222 | 9/1984 | Moisson et al. ..................... 264/230 |
| 4,586,971 | 5/1986 | Wallace, Jr. ...................... 264/342 R |
| 4,637,944 | 1/1987 | Walker .............................. 264/342 R |

FOREIGN PATENT DOCUMENTS

| | | |
|---|---|---|
| 2344129 | 3/1975 | Germany . |
| 3527633 | 2/1987 | Germany . |
| 54-23660 | 2/1979 | Japan . |
| 59-95106 | 6/1984 | Japan .............................. 264/342 R |
| 59-212226 | 12/1984 | Japan .............................. 264/342 R |
| 928752 | 6/1963 | United Kingdom . |
| 1091588 | 11/1967 | United Kingdom . |

OTHER PUBLICATIONS

Military Specification MIL-M-81531.
Military Standard MIL-STD-202F.

*Primary Examiner*—Jeffery Thurlow
*Attorney, Agent, or Firm*—Sheri M. Novack; Herbert G. Burkard

[57] ABSTRACT

A method of forming a heat-recoverable article including the steps of profile extruding polymeric material into a predetermined shape, irradiating the polymeric material and then deforming the polymeric material into a generally planar configuration. Also disclosed is a heat-recoverable article including a generally planar layer of polymeric material which is in the heat unstable condition. Opposed surfaces of the polymeric material have a latent recovery stress, however opposite in sense, so that the article upon recovering towards a predetermined shape, exhibits substantially no residual stress. Further disclosed is a heat-recoverable article made by the method.

6 Claims, 3 Drawing Sheets

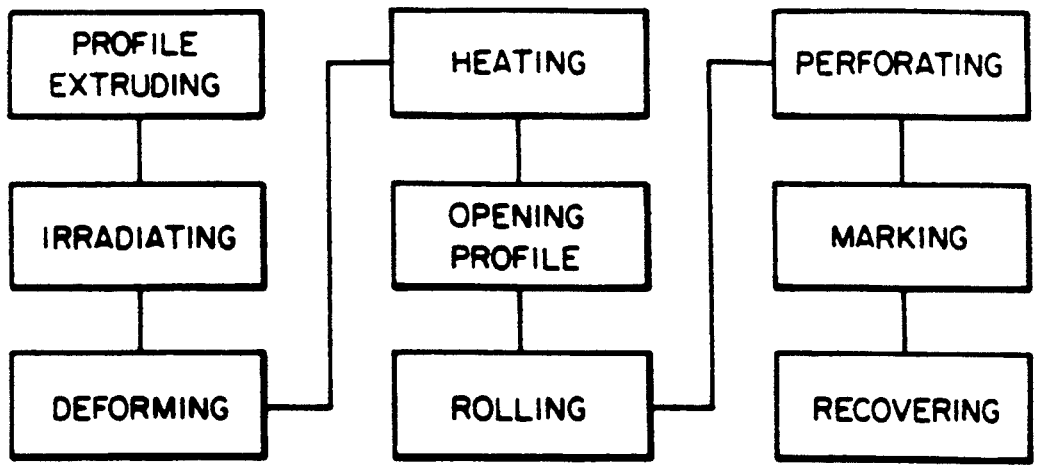
FIG_1
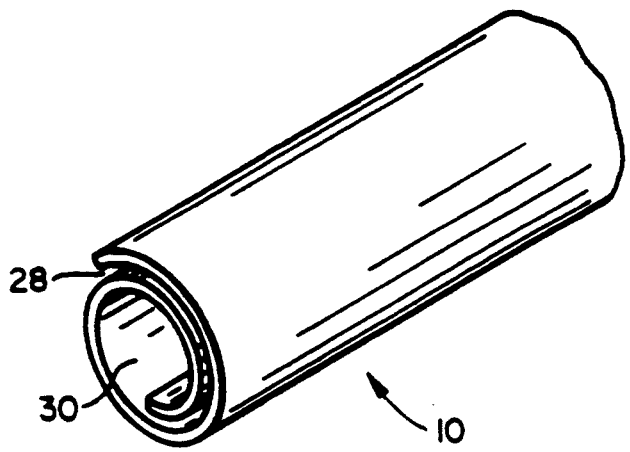
FIG_2
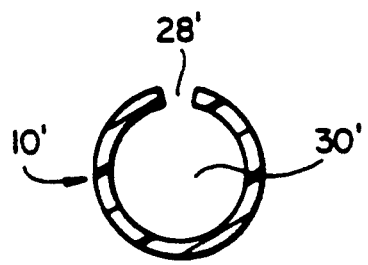
FIG_4

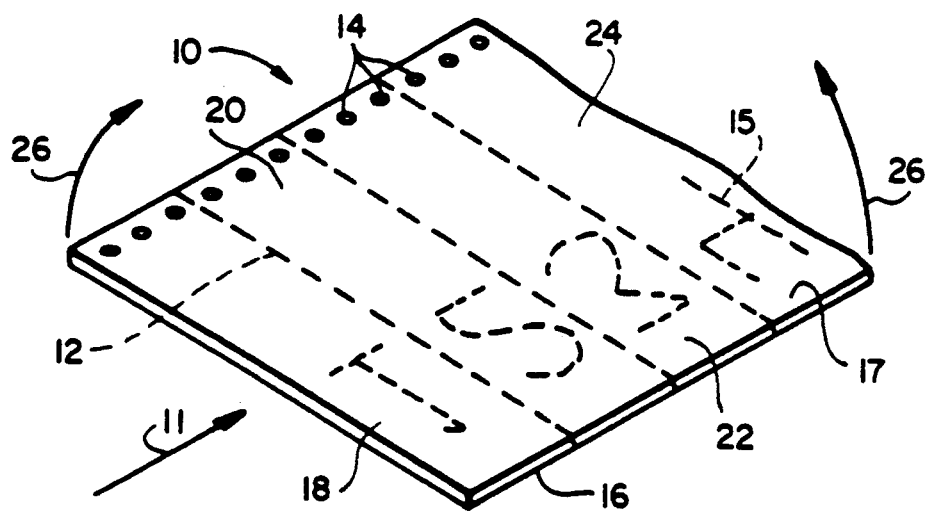
FIG_3
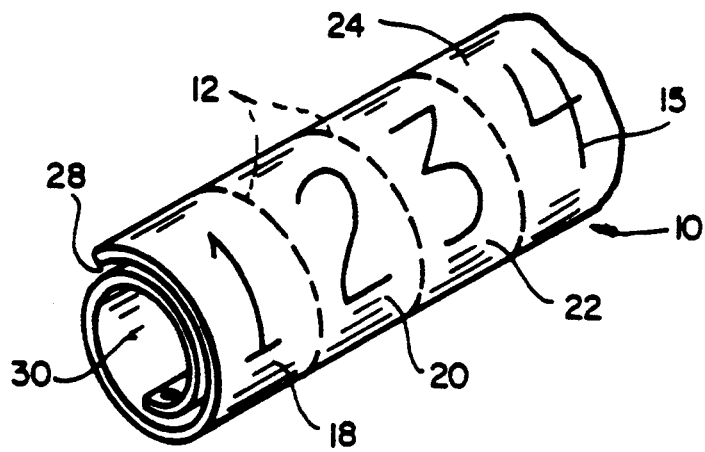
FIG_5
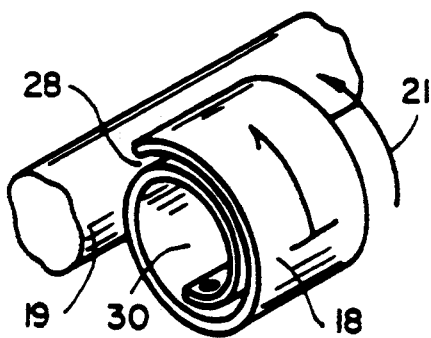
FIG_6
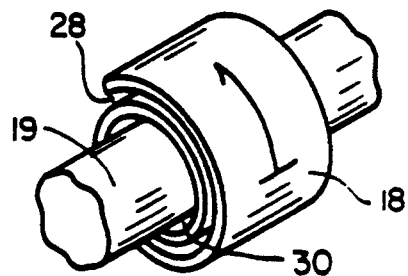
FIG_7

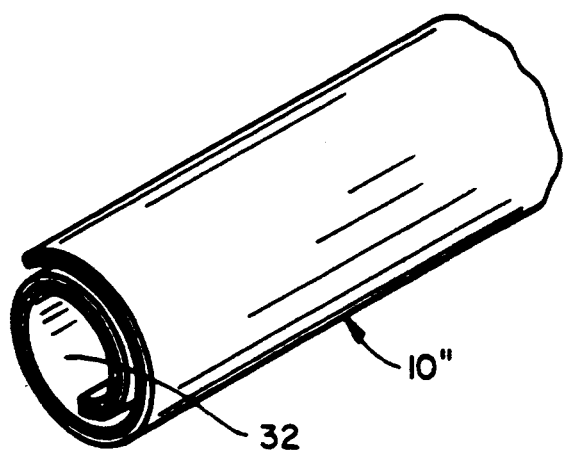
FIG_8
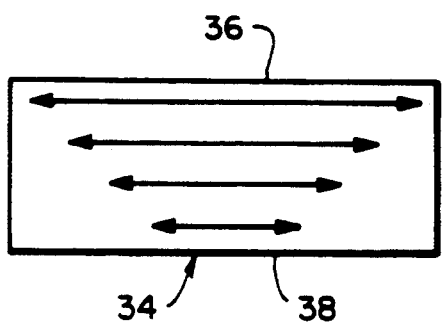
FIG_9
(PRIOR ART)
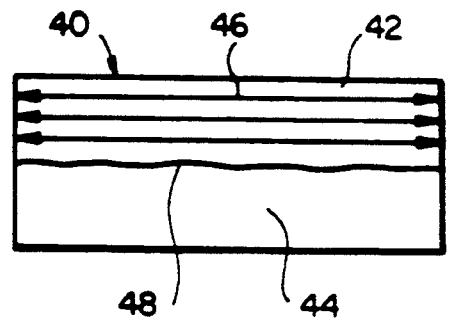
FIG_10
(PRIOR ART)
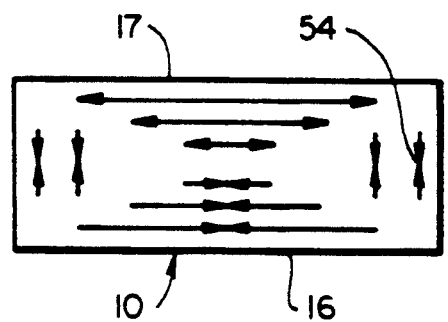
FIG_11

METHOD OF FORMING A WRAP-AROUND HEAT-RECOVERABLE ARTICLE

This application is a continuation of application Ser. No. 07/794,823, filed Nov. 18, 1991, now abandoned which application is a continuation of application Ser. No. 640,565, filed Jan. 14, 1991, now abandoned, which is a continuation of application Ser. No. 436,958, filed Nov. 15, 1989, now abandoned, which is a continuation of application Ser. No. 262,163, filed Oct. 19, 1988, now abandoned, which is a continuation of application Ser. No. 877,620, now abandoned. The disclosures of each of these applications are incorporated herein by reference.

FIELD OF THE INVENTION

This invention relates to heat recoverable articles and, more particularly, to heat recoverable articles suitable for use as wrap-around sleeves which can be easily and conveniently installed on cables, wire splices and the like for purpose of identification without the need for a free end of the cable or wire.

BACKGROUND OF THE INVENTION

Heat recoverable articles have found widespread acceptance in employment as seals or other closures in the repair and protection of generally tubular conduits or as marking sleeves for wire identification. Typically, such articles have comprised heat shrinkable tubular sleeves which describe in cross section an integral, closed curve. Among the heat recoverable sleeves so configured are those produced according to Cook U.S. Pat. No. 3,086,242 and Evans U.S. Pat. Nos. 3,894,731; 3,985,852 and 4,032,010, the disclosures of which are incorporated herein by reference.

Materials, both organic and metallic, capable of being rendered heat recoverable are well known. An article made of such materials can be deformed from an original, heat-stable configuration to a second, heat-unstable configuration. The article is said to be heat recoverable for the reason that, upon the application of heat alone, it can be caused to revert, or to attempt to revert, from its heat-unstable configuration to its original, heat-stable configuration.

While tubular sleeves are generally satisfactory in many applications, they require the provision of a free end in the cable or wire to be identified over which the sleeve can be slipped. That manner of application is often manifestly inconvenient, notably in repair cases or otherwise where the identification has to be changed after the cable or wire has been already terminated.

There have been proposed various heat-recoverable wrap-around closures which for their application do not require a free end of the substrate to be installed, but they do require some mechanical joinder of the edges and thus would not be convenient for use as sleeve markers. There also have been proposed various tags that can be fastened onto wires by means of tie-wraps but, again, these are not very convenient to use in practice.

Actioncraft Products manufactures a split-sleeve laminated product which features an easy "snap-on" installation on wires already terminated. However, due to the method of manufacture of these markers, they are delivered pre-printed, which entails considerable delays every time cable or wire rerouting occurs since new markers need to be printed at some remote site. Of course, the same delays would be encountered should new markers of this type be required for any other purpose.

Wrap-around sleeves have also been proposed in Evans U.S. Pat. Nos. 3,847,721 and 3,988,399 and Sovish et al. U.S. Pat. No. No. 3,899,807, the disclosures of which are incorporated herein by reference. Evans discloses articles rendered involutely heat recoverable by differentially annealing a molecularly oriented unitary polymeric layer so as to provide an anisotropic gradient through the thickness thereof. Sovish et al. discloses articles rendered involutely heat recoverable by lamination of a first heat recoverable layer to a second, relatively non-heat recoverable layer which resists linear recovery of the first such that the laminated article curls upon recovery. It is believed that the Evans and Sovish et al. articles have not met with commercial success primarily due to the circumstance that it is difficult to control the final shape of the article.

Various others have proposed the profile extruding of materials for a variety of purposes. Among these are Brandeis U.S. Pat. No. No. 208,363, Allen U.S. Pat. No. 2,613,620, Ruck et al. U.S. Pat. No. 2,952,037, Nevin et al U.S. Pat. No. 3,461,499, Opfell U.S. Pat. No. 3,558,420 and Behr U.S. Pat. No. 3,848,035. However, none of these relate to wrap-around heat-recoverable sleeves.

It can thus be appreciated that the need for a heat recoverable wrap-around article which does not require for its application to a substrate the presentation of a free end thereof remains unfulfilled.

Accordingly, it is an object of the invention to provide an improved heat recoverable wrap-around article which does not require for its application to a substrate the presentation of a free end thereof.

It is a further object of the invention to provide an improved heat recoverable wrap-around article which is amenable to marking printed matter thereon at the time of use.

It is still another object of the invention to provide an improved heat recoverable wrap-around article which is convenient and easy to use.

These and other objects of the invention will become more apparent after reference to the following description considered in conjunction with the accompanying drawings.

BRIEF SUMMARY OF THE INVENTION

One aspect of the invention relates to a method of forming a heat-recoverable article comprising profile extruding polymeric material into a predetermined shape, irradiating the polymeric material and then deforming the polymeric material into a generally planar configuration. Subsequent steps of the method may comprise depositing printed matter on at least one principal surface of the polymeric material, recovering the material and/or selectively perforating the polymeric material.

A further aspect of the invention relates to a heat recoverable article comprising a generally planar layer of polymeric material having opposed surfaces. The heat recoverable article is in the heat unstable condition with each of the principal surfaces having a latent recovery stress, the latent recovery stress on one principal surface being opposite in sense from the latent recovery stress on the other principal surface. The article upon recovering towards a predetermined shape exhibits substantially no residual stress with respect to each of the principal surfaces. The article may also comprise printed matter deposited on at least one principal surface and selectively placed perforations.

A final aspect of the invention relates to a heat recoverable article produced by the method comprising profile extruding a layer of polymeric material into a predetermined shape, the layer having opposed principal surfaces, irradiating the polymeric material, and then deforming the polymeric material into a generally planar configuration. The article so deformed is in the heat unstable condition with each of the principal surfaces having a latent recovery stress, the latent recovery stress on one principal surface being opposite in sense from the latent recovery stress on the other principal surface. The heat recoverable article produced by the method may further comprise the steps of depositing printed matter on at least one principal surface of the polymeric material, recovering the article and/or selectively perforating the polymeric material.

BRIEF DESCRIPTION OF THE DRAWINGS

FIG. 1 is a block diagram illustrating the method according to the invention.

FIG. 2 is a perspective view of a profile extrusion of polymeric material into a predetermined shape according to the invention.

FIG. 3 is a perspective view of the polymeric material of FIG. 2 which has now been deformed according to the invention.

FIG. 4 is a cross-sectional view of another embodiment of the profile extrusion according to the invention.

FIG. 5 is a perspective view of the polymeric material of FIG. 3 after recovery.

FIGS. 6 and 7 are perspective views illustrating the article according to the invention in use.

FIG. 8 is a perspective view of the profile extrusion of FIG. 2 with a further layer of adhesive.

FIG. 9 is an end view of a prior art article indicating the distribution of stresses therein.

FIG. 10 is an end view of another prior art article indicating the distribution of stresses therein.

FIG. 11 is an end view of the article according to the invention in the direction of arrow 11 in FIG. 3 indicating the distribution of stresses therein.

DETAILED DESCRIPTION OF THE INVENTION

According to the invention there is disclosed a method of forming a heat recoverable article comprising profile extruding polymeric material into a predetermined shape, irradiating the polymeric material and then deforming the polymeric material into a generally planar configuration. Subsequent steps of the method may comprise the depositing of printed matter on at least one principal surface of the generally planar polymeric material, heating the article so as to cause it to recover towards its predetermined shape, and/or selectively perforating the generally planar polymeric material.

Referring to the figures in more detail and particularly referring at this time to FIG. 1 there is shown a block diagram illustrating the method of the invention. Thus, the first step in the method according to the invention comprises profile extruding polymeric material into a predetermined shape. A preferred predetermined shape is illustrated in FIG. 2 generally denoted as 10. As it can be seen this profile has an overlapping or coil-shaped configuration. The reason for the preferred overlapping or coil-shaped configuration will become apparent hereafter.

It is preferred that the profile extrusion consist essentially of a single layer of polymeric material. It is of course conceivable and contemplated within the scope of the invention that there may be times that a profile will be co-extruded such that there will be two or more layers of polymeric material. This, of course, is within the skill of one skilled in the art provided, of course, one has the appropriate extrusion equipment.

Alternatively, the predetermined shape may appear c-shaped as shown in FIG. 4.

The next step in the method is irradiating the polymeric material with a suitable electron beam source so as to cause cross-linking of the material.

Continuing, the process further comprises deforming the polymeric material into a generally planar configuration. This deformation actually comprises at least three separate steps. The extruded material is first heated above its crystalline melting point, the profile is opened and then passed between opposed rolls so as to flatten it. Simultaneously with the step of rolling, the material is also cooled below its crystalline melting point. The material is now in the heat unstable condition. FIG. 3 illustrates the profile 10 after flattening. It can be appreciated that when the material is flat as shown in FIG. 3, the material can be easily coiled up for further handling or shipping.

In a subsequent step the polymeric material may be selectively perforated. These perforations may take at least two forms. The first type of perforation 12 may be a perforation that extends laterally across the planar layer of the material and the second form of perforation 14 may take the form of pin feed holes which extend longitudinally of the length of the planar material. The reasons for these perforations will become apparent shortly.

The method may further comprise the step of depositing printed matter 15 on at least one principal surface 16 of the generally planar polymeric material. As shown in FIG. 3, the printed matter is deposited on the principal surface hidden from the viewer. Thus, the printed matter appears in phantom.

It can be appreciated by now that the article 10 shown in FIG. 3 is actually a strip of markers. The printed matter 15 serves as the identifying indicia. The transverse perforations 12 allow for separation of individual markers 18, 20, 22, 24, etc. The longitudinal perforations 14 (i.e., the pin feed holes) complement the tractor feed mechanism on a suitable printing apparatus, such as a dot matrix printer.

In a final step of the process, the strip of markers may be heated so as to cause it to recover towards its predetermined shape. Referring again to FIG. 3, the article will tend to recover in the direction of the arrows 26 towards the predetermined shape shown in FIG. 2. The recovered strip of markers is illustrated in FIG. 5.

Thus, the process according to the invention provides for the efficient and versatile production of a continuous strip of markers. After deformation, the flattened strip may be coiled up for storage or shipping. Instead of coiling up the strip, it may be directly fed into an apparatus for adding the perforations and then into a suitable printer, such as a dot matrix printer, for printing. At this point, the strip of markers may again be coiled up, or alternatively, the strip may be fed directly into a heating area, e.g. an oven, so as to cause recovery of the polymeric material.

Referring now to FIGS. 6 and 7, in use, a recovered marker would be detached from the strip of markers. The marker, for example marker 18, would be placed generally parallel to a section of the wire 19 which is desired to be identified. The marker 18 would then be placed against the wire 19 with gap 28 receiving the wire. Gap 28 is sufficiently variable due to the springiness of the marker material so that a broad range of wire dimensions may be accommodated. The marker 18 would then be rotated in the direction of arrow 21 shown in FIG. 6 with the marker spiraling around the wire until the wire lays within a cavity 30 as shown in FIG. 7. The marker 18 is now fully installed.

An alternative method of using the article of the invention (not shown) would be to remove, for example, marker 18 from the strip of markers shown in FIG. 3. The planar marker 18 would be placed adjacent to a wire and then heated to cause recovery of the marker. Upon recovering, the marker would curl around the wire so that the final result would be similar to that shown in FIG. 7.

Should the embodiment of FIG. 4 be utilized, the wire may simply be inserted through gap 28' until the wire resides in cavity 30'. Gap 28' should, of course, be smaller than the outside diameter of the wire to be identified so as to avoid the marker falling off the wire. The fact that the gap 28' is smaller than the outside diameter of the wire presents no problem since the marker has a certain amount of springiness which allows gap 28' to expand somewhat.

The article could be made of a variety of thermoplastic materials that exhibit elastic memory properties after cross-linking. Such thermoplastic materials may include polyethylenes, fluoropolymers, elastomers, etc. However, the selection of materials suitable for a product used as a marking sleeve must be made with the following considerations in mind. Firstly the material must be receptive enough to ink so that the printed product can withstand normal handling without smearing of the ink before the ink has been properly dried. Secondly the material once recovered and installed on a wire cable must be rigid enough to hold onto the wire without opening and falling off in time or when subjected to normal handling such as would occur where many wires can be bunched up together near terminal blocks. With these limitations in mind, it has been found that polyvinylidene fluoride works particularly well for use in the invention. However, it is also anticipated that other semi-rigid or rigid materials would work satisfactorily. Such materials may include by way of illustration and not of limitation copolymers of polyvinylidene fluoride, medium density polyethylene, high density polyethylene, copolymers of ethylene and tetrafluoroethylene, copolymers of ethylene and chlorotrifluoroethylene and semi-rigid polyvinylchloride. By semi-rigid it is meant a plastic that has a stiffness or apparent modulus of elasticity of between 10,000 and 100,000 psi. By rigid, it is meant a plastic that has a stiffness or apparent modulus of elasticity of greater than 100,000 psi.

An interesting and quite surprising aspect of Applicants' invention is that the ink when applied to the material has been found to be permanently deposited thereon after recovery of the polymeric material. By permanent it is meant that markers having printed matter deposited thereon would pass the tests as specified in Military Specification MIL-M-81531 and Military Standard MIL-STD-202F. These military requirements specify various tests for testing the permanence of ink on substrates. MIL-M-81531 specifies rubbing with an eraser a certain number of times. MIL-STD-202F, a more rigorous test, species immersion in a specified solvent and then brushing with a toothbrush. If a mark (i.e., the printed matter) were to pass these tests, it is considered to be permanently indicated thereon.

This result is quite surprising since prior art methods of obtaining mark permanency have been unsuccessful or at least more cumbersome. One method of obtaining mark permanency is to apply a separate surface coating to the material which is very receptive to the ink. Another way of achieving mark permanency is by permatizing, a process commercialized by Raychem Corporation, the assignee of the instant application. While not wishing to be held to any particular theory, it is believed that mark permanency is due to a particular surface texture developed as a result of, for example, melt fracture during extrusion or alternatively later surface roughening imposed during the rolling of the markers. This development of a surface texture creates pores or nooks and crannies for ink to "hide" in which then become smaller after recovery, effectively preventing the ink from later being worn away by solvents or handling.

The surprising mark permanency discovered by the instant Applicants is not limited solely to the articles and markers disclosed herein but, instead, has broad application to other polymeric articles and markers where mark permanency may also be desirable.

Another embodiment of the invention is illustrated in FIG. 8. In this embodiment, the extruded profile, generally indicated by 10", contains an inner layer of adhesive material 32. This adhesive material is most conveniently applied when the heat-recoverable article is in its flat position as shown in FIG. 3. This method of applying the adhesive is preferable to it being co-extruded as would be the case if it were to be applied to the configuration shown in FIG. 2. It is further preferred that the adhesive be a hot melt adhesive so it would flow at the recovery temperature of the underlying polymeric material.

At first glance Applicants' heat-recoverable article may appear similar to the heat-recoverable articles of the Evans and Sovish et al. patents discussed in the Background of the Invention. However, it is believed that Applicants' article is fundamentally different. In this regard reference to FIGS. 9 to 11 will be helpful. FIG. 9 illustrates the stress distribution in an article 34 produced according to the method of Evans. The Evans article has been oriented so as to exhibit a frozen-in tensile recovery stress represented by arrows 36. However, one side 38 of the Evans article has been annealed so as to lessen or eliminate the frozen-in tensile recovery stress on that side. In this way, an anisotropic stress gradient has been formed. FIG. 10 illustrates the stress distribution of an article 40 produced according to the method of Sovish et al. In this article, a frozen-in tensile recovery stress represented by arrows 46 has been applied to only one layer 42 of the article wherein a second, laminated layer 44 contains no such frozen-in tensile recovery stress. Thus at the interface 48 of the Sovish et al. article 40, there is a rapid change from essentially zero stress to substantially the maximum frozen-in tensile recovery stress. In the Evans article 34 the transition is less rapid but otherwise it is essentially the same as the Sovish et al. article. According to Applicants' article, shown in FIG. 11, however, its flat dimensionally heat unstable configuration has one surface 17 that exhibits a maximum frozen-in tensile recovery stress while the opposite surface 16 exhibits a maximum frozen-in compressive recovery stress. Of course, the tensile and compressive stresses are developed as a result of the opening up and flattening of the profile extruded article. Now it is possible that in the course of flattening the extruded material a compressive stress 54 may be superimposed over the frozen-in recovery forces. However, this compressive stress will not drastically affect the distribution of the frozen-in recovery forces so that opposite surfaces will have tensile and compressive recovery forces, respectively.

It should be understood that the terms tensile recovery stress and compressive recovery stress have the following definitions. The term tensile recovery stress connotes that recovery stress that is exhibited by an article, that has been previously converted into its dimensionally heat unstable state by a substantially tensile deformation, when heated to its recovery temperature while constrained from recovering. The term compressive recovery stress connotes that recovery stress that is exhibited by an article, that has been previously converted into its dimensionally heat unstable state by a substantially compressive deformation, when heated to its recovery temperature while constrained from recovering.

Further disclosed according to the invention is a heat-recoverable article comprising a generally planar layer of polymeric material having opposed surfaces. The article is in the heat unstable condition with each of the principal surfaces having a latent recovery stress, the latent recovery stress on one principal surface being opposite in sense from the latent recovery stress on the other principal surface. The article upon recovering towards a predetermined shape exhibits substantially no residual stress with respect to each of the principal surfaces.

Referring to FIG. 3, there is shown the heat-recoverable article according to the invention wherein the article comprises a generally planar layer of polymeric material having opposed surfaces 16, 17. The article is in the heat unstable condition. Referring to FIG. 11, it can be seen that each of the principal surfaces 16, 17 has a latent recovery stress with the latent recovery stresses on opposite sides being opposite in sense. Opposite in sense means the latent recovery stress on one side is substantially compressive in nature while the latent recovery stress on the other side is substantially tensile in nature. The article upon recovering towards a predetermined shape as shown in FIG. 5 exhibits substantially no residual stress with respect to each of the principal surfaces. Thus when the material is allowed to freely recover the stresses shown in FIG. 11 would practically disappear as the material fully relaxes as a result of its recovery. The result is just the opposite with the prior art articles shown in FIGS. 9 and 10. These articles upon heating would tend to form an involute shape similar to Applicants' shape, however, there would be no relaxation of the stresses.

As further shown in FIG. 3, the article may contain and usually will contain printed matter 15. As discussed earlier, the printed matter will usually be permanently deposited thereon.

So as to provide separability for the individual articles, selectively placed perforations 12 are provided for this purpose.

Finally, there is disclosed according to the invention a heat-recoverable article produced by the method comprising profile extruding a layer of polymeric material into a predetermined shape, the layer having opposed principal surfaces, irradiating the polymeric material and then deforming the polymeric material into a generally planar configuration. The article is in the heat unstable condition with each of the principal surfaces having a latent recovery stress, the latent recovery stress on one principal surface being opposite in sense from the latent recovery stress on the other principal surface.

As is apparent, the heat-recoverable article produced by the method conforms generally to the article described previously which was produced by the method of FIG. 1.

The article produced by the method may comprise the subsequent steps of depositing printed matter on at least one principal surface of the polymeric material and then heating the article so as to cause it to recover towards its predetermined shape. The article upon recovery towards its predetermined shape would then exhibit substantially no residual stress with respect to each of the principal surfaces. Finally, the article produced by the method may also comprise a subsequent step of selectively perforating the generally planar polymeric material so as to provide means for separating individual markers.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

We claim:

1. A method of forming a heat recoverable article comprising:
    profile extruding polymeric material having a modulus of elasticity of at least about 10,000 psi into a tubular configuration having a longitudinal slit providing opposing longitudinal edges which are overlapped to form a coil-shape in cross section;
    irradiating the polymeric material; and
    uncoiling and opening the tubular configuration to result in the entire material all lying in a plane.

2. The method of claim 1 further comprising the subsequent step of depositing printed matter on at least one principal surface of the heat recoverable article.

3. The method of claims 1 or 2 further comprising the subsequent step of heating the article so as to cause it to recover towards its tubular configuration.

4. The method of claims 1 or 2 further comprising the subsequent step of selectively perforating the heat recoverable article.

5. The method of claim 1 wherein the polymeric material consists essentially of a single layer of polymeric material.

6. The method of claim 1 further comprising the subsequent step of applying a layer of adhesive.

* * * * *